(No Model.)
A. D. STEARNS.
APPARATUS FOR HOLDING AND DIPPING PILLS.
No. 493,604. Patented Mar. 14, 1893.
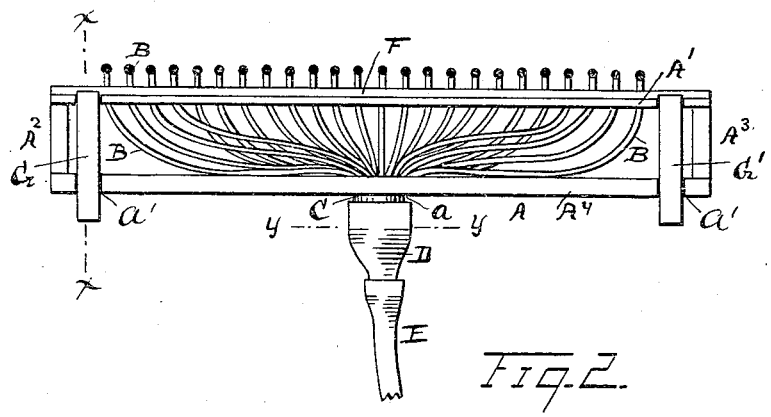
Fig. 1.
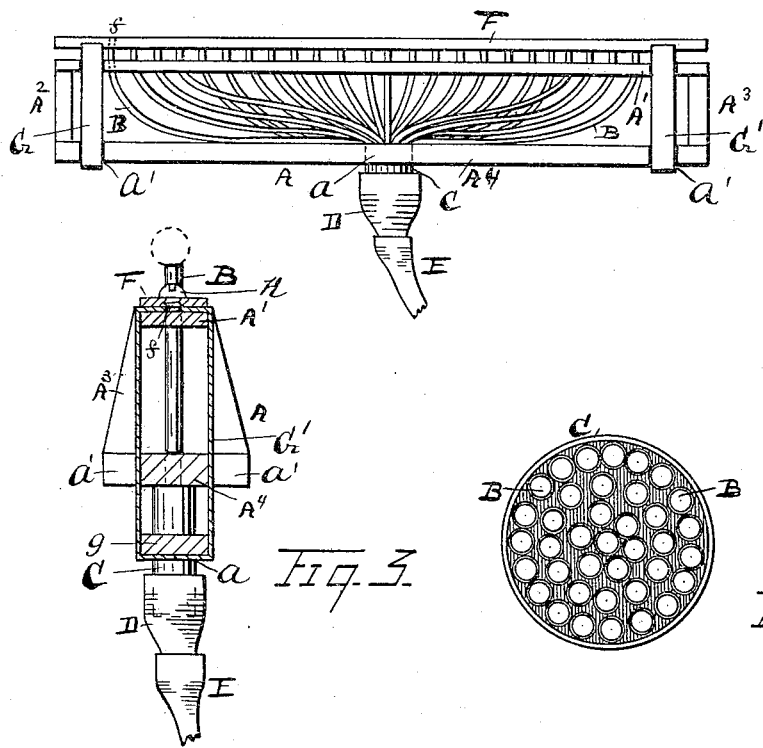
Fig. 2.
Fig. 3.
Fig. 4.
Witnesses
John Schuman.
John F. Miller.
Inventor
Albyn D. Stearns
By his Attorney
Newell S. Wright

UNITED STATES PATENT OFFICE.

ALBYN D. STEARNS, OF DETROIT, MICHIGAN, ASSIGNOR TO FREDERICK STEARNS & COMPANY, OF SAME PLACE.

APPARATUS FOR HOLDING AND DIPPING PILLS.

SPECIFICATION forming part of Letters Patent No. 493,604, dated March 14, 1893.

Application filed August 31, 1892. Serial No. 444,624. (No model.)

*To all whom it may concern:*

Be it known that I, ALBYN D. STEARNS, a citizen of the United States, residing at Detroit, county of Wayne, State of Michigan, have invented a certain new and useful Improvement in Apparatus for Holding and Dipping Pills; and I declare the following to be a full, clear, and exact description of the invention, such as will enable others skilled in the art to which it appertains to make and use the same, reference being had to the accompanying drawings, which form a part of this specification.

My invention relates to certain new and useful improvements in an apparatus for holding and dipping pills in the operation of coating them with sugar or gelatine, and it consists of the devices and appliances, their construction combination and arrangement, as hereinafter described and claimed, and illustrated in the accompanying drawings, in which—

Figure 1 is a side elevation showing the removing bar retracted against the stationary cross bar. Fig. 2 is a similar view, but showing the removing bar thrown upward. Fig. 3 is a cross section on the line $x$—$x$ Fig. 1; and Fig. 4 is an enlarged section on the line $y$—$y$ Fig. 1, the union D being omitted.

The object of my invention is to provide a simple, economical and efficient apparatus of this nature, whereby the pills are held, in dipping, by suction or atmospheric pressure, produced by a suitable exhaustion of the air beneath the pills when in position to be dipped.

I carry out my invention as follows:

A represents a suitable frame provided with a stationary cross bar $A'$ forming a portion of the frame, said cross bar engaged by connecting end pieces $A^2$, $A^3$ upon a lower cross bar of the frame $A^4$. The stationary cross bar $A'$ is perforated to receive a series of tubes B, which project outward therefrom, and which toward the cross bar $A^4$ are preferably grouped together and passed through a suitable orifice at "$a$," their grouped ends being surrounded by a ferrule C, upon which is engaged a removable union D, to the outer end of which is attached a suction hose E, to which any suitable apparatus may be attached to exhaust the air in the tubes simultaneously when the pills are engaged thereupon. When the apparatus is in the position shown in Fig. 1, pills are engaged upon the tubes B projecting above the apparatus and the air being exhausted beneath the pills, the apparatus may be inverted to dip the pills.

F denotes a removing bar perforated as indicated at "$f$" for the passage of the tubes B. Said removing bar has a reciprocatory engagement upon the frame A and upon the outer ends of the tubes B. This allows the removing bar F to be raised into the position shown in Fig. 2 to lift the pills off from the adjacent ends of the tubes B. The bar F is held in engagement with the frame A in any suitable manner, as by means of metal bands G, $G'$ engaged therewith and extended over the bar $A^4$, the latter bar being recessed as shown at "$a'$" upon its edges, through which recesses the bands G $G'$ are passed. Said bands may be made of a single strip of metal, having its adjacent ends united to a block "$g$." The bands are made of such length as to permit the desired reciprocation of the bar F. Intermediate the ends of the bands, which embrace the bar $A'$, the bar F is preferably engaged therewith so as to be readily removed therefrom, as by means of screws H.

By making the bar F removable, different bars of a similar nature may be engaged with the apparatus. This will permit the apparatus to be used for dipping pills of different sizes, as bars of suitable sized perforations may be used interchangeably to remove the pills from the tubes.

The feature of making the removing bar F reciprocatory and removable it will be seen is an important one, and makes the apparatus of superior efficiency. By making said bar removable, also, in any suitable manner, a series of said bars may be employed, so that after the dipping process has been effected, the bar may be removed with the pills held in place seated upon the perforations thereof for drying, and another bar be applied to the apparatus for a successive operation.

It will be observed that should any individual pills become unseated on the ends of the individual tubes, the breakage of the suction through the corresponding tube would not affect the exhaustion of the air through the remaining tubes, so as to prevent the adhesion of the remaining pills upon the correponding tubes, as would be liable to be the case where a series of tubes were not employed.

What I claim as my invention is—

1. In an apparatus for holding and dipping pills, the combination of a frame constructed with a cross bar A' and a cross bar A⁴, of a series of tubes engaged with the bar A' and spaced therein one from another, said tubes assembled at the opposite extremities and passed through the bar A⁴, and a suction tube engaging the assembled ends of said tubes, substantially as described.

2. In an apparatus for holding and dipping pills, the combination of a frame, a series of tubes engaged with said frame forming seats for the pills at one end, a suction device connected with the opposite ends of said tubes, and a perforated reciprocatory removing bar engaged with said frame and with said tubes, said frame and tubes having a removable engagement with said suction device, substantially as described.

In testimony whereof I sign this specification in the presence of two witnesses.

ALBYN D. STEARNS.

Witnesses:
N. S. WRIGHT,
JOHN F. MILLER.